US007720711B2

(12) United States Patent
Taylor

(10) Patent No.: US 7,720,711 B2
(45) Date of Patent: May 18, 2010

(54) SELF-GUIDING INTERFACE FOR CUSTOMER SERVICE MACHINES

(75) Inventor: Jason W. Taylor, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 12/008,877

(22) Filed: Jan. 15, 2008

(65) Prior Publication Data

US 2009/0182638 A1 Jul. 16, 2009

(51) Int. Cl.
*G06Q 20/00* (2006.01)
(52) U.S. Cl. .......................................... 705/16
(58) Field of Classification Search ............... 705/16
See application file for complete search history.

(56) References Cited

U.S. PATENT DOCUMENTS

| | | | |
|---|---|---|---|
| 6,236,736 B1 | 5/2001 | Crabtree et al. | |
| 6,354,498 B1 * | 3/2002 | Lutz ........................... | 235/385 |
| 6,382,357 B1 * | 5/2002 | Morrison et al. .............. | 186/61 |
| 6,390,363 B1 * | 5/2002 | Morrison et al. ............. | 235/383 |
| 6,408,279 B1 | 6/2002 | Mason | |
| 6,427,915 B1 * | 8/2002 | Wike et al. ................... | 235/383 |
| 6,536,658 B1 * | 3/2003 | Rantze ........................ | 235/375 |
| 6,842,115 B1 * | 1/2005 | Harris et al. .............. | 340/572.1 |
| 6,908,385 B2 * | 6/2005 | Green .......................... | 463/29 |
| 6,990,463 B2 * | 1/2006 | Walter et al. ................... | 705/16 |
| 7,070,097 B2 | 7/2006 | Blanford et al. | |
| 7,177,954 B1 | 2/2007 | van Allen et al. | |
| 7,246,745 B2 * | 7/2007 | Hudnut et al. ............... | 235/383 |
| 7,255,200 B1 * | 8/2007 | Walter ......................... | 186/64 |
| D558,481 S * | 1/2008 | Dias ............................ | D6/402 |
| 7,325,731 B2 * | 2/2008 | Tashiro ....................... | 235/383 |
| 7,328,170 B2 * | 2/2008 | Jacobs et al. .................. | 705/21 |
| 7,503,490 B1 * | 3/2009 | Bobbitt et al. .............. | 235/383 |
| 7,558,742 B2 * | 7/2009 | Kloubakov et al. ........... | 705/21 |
| 7,575,162 B1 * | 8/2009 | Malchak et al. ............. | 235/383 |
| 2003/0078849 A1 * | 4/2003 | Snyder ......................... | 705/23 |
| 2003/0120547 A1 * | 6/2003 | Walter et al. .................. | 705/16 |
| 2004/0122754 A1 * | 6/2004 | Stevens, III .................. | 705/35 |
| 2005/0015301 A1 * | 1/2005 | Johnson ........................ | 705/15 |
| 2007/0102513 A1 * | 5/2007 | Scheb ......................... | 235/383 |
| 2007/0235533 A1 * | 10/2007 | Giordano .................... | 235/383 |
| 2008/0087724 A1 * | 4/2008 | Kobres et al. ............... | 235/383 |
| 2009/0231300 A1 * | 9/2009 | Kyle .......................... | 345/174 |

OTHER PUBLICATIONS

Practices offer auto check in, American Medical News: Chicago, Feb 20, 2006 vol. 4, Issue 7, p. 23.*
Do it yourself checkout, Pittsburg Post Gazette, Apr. 26, 2005 p. E1.*

* cited by examiner

*Primary Examiner*—Matthew S Gart
*Assistant Examiner*—Harshad Parikh

(57) ABSTRACT

A customer service machine, such as a self check-out terminal, includes a visual indicator and a proximity sensor associated with certain functional components or stations of the terminal, such as itemization, bagging and payment stations. The visual indicator is configured to provide a visual signal to either encourage or deter customer activity at the particular station, depending upon whether any activity is required to further a transaction being conducted at the terminal. The proximity sensor at each station determines whether the customer is about to take action at that station. A controller determines whether the action is appropriate, and if not activates the visual indicator to deter such action, or if so activates the visual indicator to encourage such action. In one embodiment, the visual indicator includes a red light that is illuminated to deter action and a green light that is activated to encourage action.

13 Claims, 2 Drawing Sheets

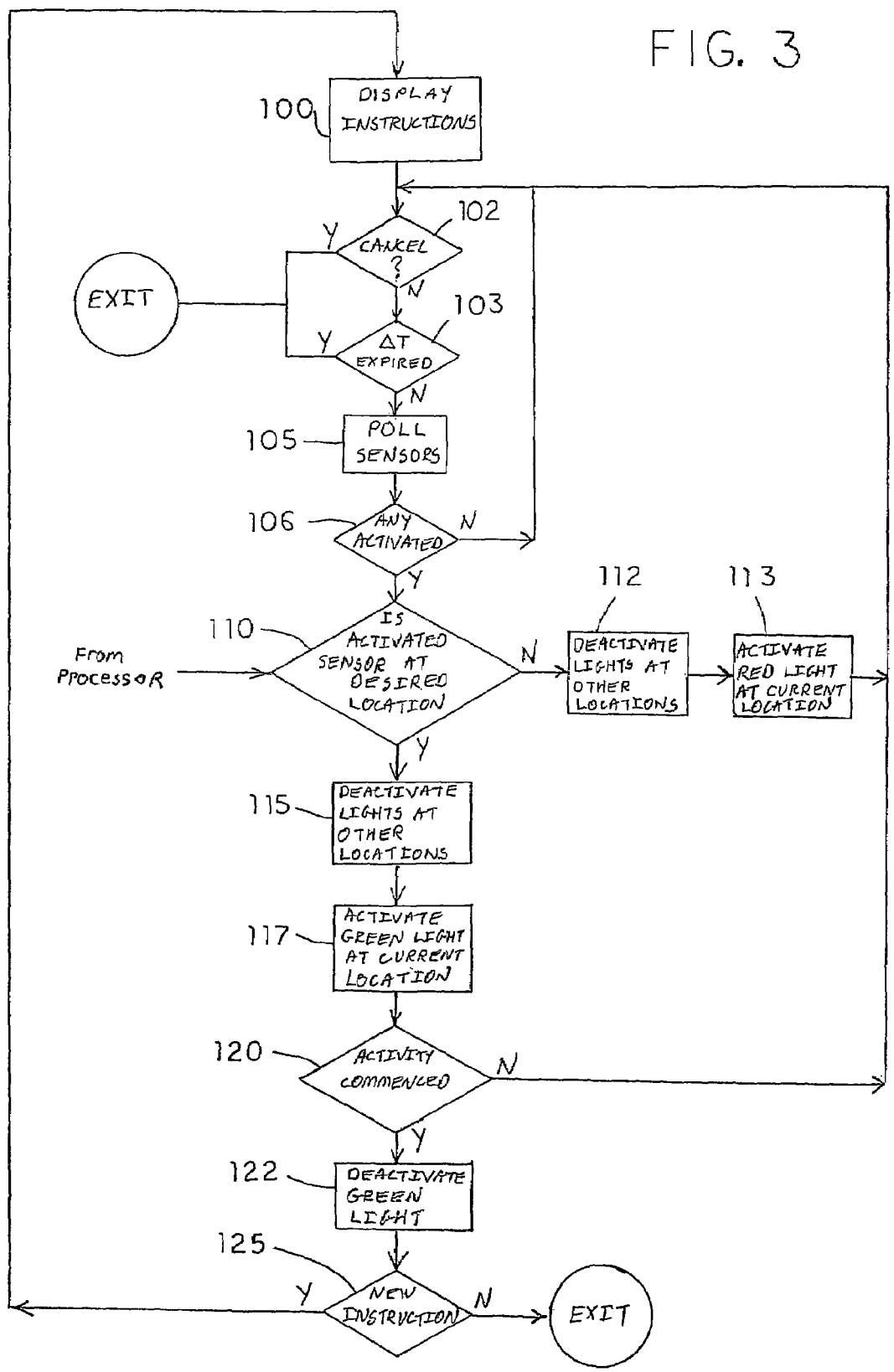

SELF-GUIDING INTERFACE FOR CUSTOMER SERVICE MACHINES

BACKGROUND

In the retail industry, labor is the number one expense after cost of goods sold. Employees working as "checkout personnel" or "cashiers" are the single largest category of labor. This is particularly true for those retailers in the food segment. On average, the retailer must have three or more cashiers trained for every checkout lane in a food store.

One problem for retailers is the cost associated with the recruiting, hiring, training, scheduling, managing, etc. of cashiers. This cost is exacerbated in that turnover in the food segment can easily exceed 100% annually, especially in metropolitan areas. It is not uncommon for food retailers to have significantly fewer cashiers on hand in a retail establishment than is optimally required. The constant recruiting, hiring, training, and scheduling of cashiers customers leads to significant management time and expense. Scheduling alone can make or break a retailer's performance on any given day and significantly impact customer service. By scheduling too many cashiers, the retailer has excess capacity and a higher cost of sales for the day. By scheduling too few cashiers, checkout queues grow long with angry customers who may not return due to poor customer service. Other customers may enter the store and go elsewhere due to the long lines. Checkout problems are typically the leading customer dissatisfaction issue for retailers.

Self Checkout (SCO) Terminals offer benefits to both the retailer and the customer. For the retailer, SCO terminals reduce the retailer's need for cashiers, thereby reducing the costs associated with them. Since SCO terminals are rarely closed, the job of predicting and scheduling cashier demand is made easier. For the customer, SCO terminals offer the perception of faster checkout, privacy, control, etc., and a significantly enhanced shopping experience.

Typical SCO solutions have adapted the technologies used in other customer service arenas, such as automated teller machines, bill paying kiosks and the like. In many cases, these customer service machines are perceived as lacking support for the customer throughout the transaction. In the case of an SCO system, the retailer must keep a cashier or clerk on hand to assist customers having difficulty navigating their way through a self-service checkout. In the case of other types of customer service machines, human assistance may be unavailable, leaving the customer no choice but to abort an attempted transaction when problems are encountered.

In using a typical SCO terminal the customer scans individual items for purchase across a scanner and then places the scanned item into a grocery bag, if desired. The customer then pays for his or her purchase either at the self-service checkout terminal if so equipped, or at a central payment area which is staffed by a store employee. Thus, SCO terminal permits a customer to select, itemize, and in some cases pay for his or her purchase without the assistance of the retailer's personnel.

However, a customer typically has little or no training in the operation of an SCO terminal or other types of customer service machines. One concern that retailers have when evaluating an SCO terminal is the level of supervision provided to inexperienced customers. Another concern is that a customer may attempt to shortcut a transaction when problems are encountered, resulting in irregularities in the transaction. A mutual concern for SCO terminals as well as unattended customer service machines is that customer frustration will lead them to abandon the self-service features and insist on conducting their transactions before a live cashier, clerk or teller. This frustration is felt not only by the customer having trouble completing a transaction, but also by other customers waiting in line for access to the customer service machine.

Most customer service or self-service machines include a screen which displays instructions intended to guide the customer through the transaction. Some displays include a picture or simulation of the necessary activity. Nevertheless, in spite of the comprehensiveness of the visual display, customers will still make errors or become intimidated of frustrated. What is needed therefore is customer service machine, such as an SCO terminal, which assists or otherwise interactively guides a customer in the use machine.

SUMMARY

A device and method is provided for guiding a customer through a transaction conducted at a self-service machine, such as a self check-out (SCO) terminal. The self-service machine includes a plurality of stations or components at which the customer conducts certain activities in furtherance of the transaction. At least some of these stations/components include a proximity sensor to sense whether the customer is near the particular station. An indicator is associated with each proximity sensor and is activated when the proximity sensor detects the customer's presence. The manner in which the indicator is activated depends upon whether action is to be taken at that station at that particular time, a determination that is made by the central processor for the machine. If no activity at the station is called for at the particular point in the transaction, the indicator is activated to deter the customer from acting. If the particular step in the transaction calls for customer activity at the station, the indicator is activated to promote or encourage customer action.

Thus, in one embodiment in which the customer service machine is an SCO terminal, the bagging and payment stations may include the proximity sensor and indicator pairs. Each indicator may include a red light to deter or discourage activity at the station, and a green light to promote or encourage customer action. If the customer is required to place a newly scanned item into the bagging station but the proximity sensor for the payment station detects the customers presence, the red light associated with the payment station is activated to deter the customer from taking action (i.e., making payment) at the payment station at that time. When the proximity sensor at the bagging station detects the customers presence, the green light at that station is activated to encourage the customer to take the appropriate action.

In accordance with the preferred embodiment, the indicator for only one station at a time is activated to avoid confusion. The indicators are only activated if and only so long as the customer's presence is detected at the associated station. Moreover, the nature of the indicator (i.e., red light or green light) is based on the sequence of activities required for the transaction, as monitored and controlled by the central processor of the machine.

BRIEF DESCRIPTION OF THE FIGURES

FIG. 3 is a process flowchart illustrating the operation of the terminal in the embodiment shown in FIG. 1.

DESCRIPTION OF THE EMBODIMENTS

Figures 1, 2:
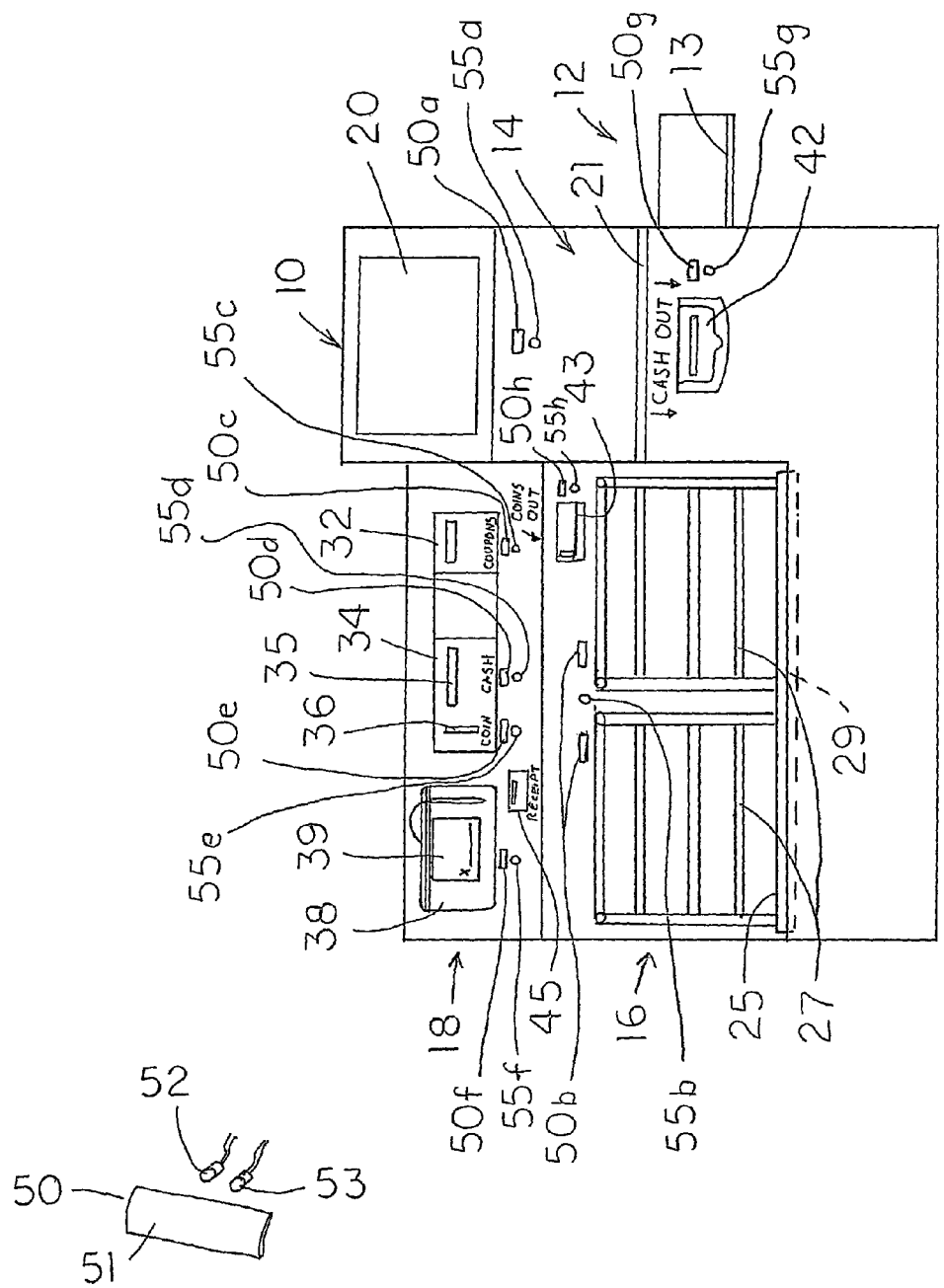
FIG. 1 is a front view of a customer service machine, and more particularly a self check-out terminal, according to one embodiment.
FIG. 2 is a perspective view of a visual indicator for use in the embodiment shown in FIG. 1.

For the purposes of the present disclosure, a self checkout (SCO) terminal is described. However, it is understood that the concepts disclosed herein can be applied to other types of customer service or self-service machines, such as automated teller machines, bill payment kiosks and the like, in which a customer must execute a series of steps to complete a transaction.

An SCO terminal 10 shown in FIG. 1 includes a pre-scan station 12, an itemization or scanning station 14, a bagging station 16 and a payment station 18. The pre-scan station 12 can include a shelf 13 where a customer can stage product to be scanned for purchase. The itemization station 14 includes a scanner 21 that is operable to read a code, such as a UPC code, associated with the products to be purchased. The station 14 may also incorporate a produce scale for weighing produce to be purchased. The bagging station 16 includes a security scale 29 that registers the weight of product placed at the station after scanning. The central processor of the terminal evaluates the change in weight registered by the security scale to determine whether an item placed therein has been properly scanned. The bagging station 16 may include a bag well 25 with bag holders 27 for supporting shopping bags as they are being filled with newly scanned products.

The payment station 18 may include a coupon acceptor 32 and a payment acceptor 34 in the form of a cash acceptor 35 and a coin acceptor 36. The station 18 may also include a card reader 38 with an associated display or signature screen 39 to process payments by credit or debit card. A cash dispenser 42 and coin dispenser 43 may be associated with the payment station 18 to provide change or requested cash to the customer during when the transaction is completed. The payment station further includes a receipt printer 45 that provides a receipt to the customer when the transaction is completed.

The terminal 10 includes central processor (not shown) that controls the operation of the SCO terminal according to pre-determined steps for the transaction. A user interface 20, which is typically adjacent the itemization station 14, provides a display and input interface for the customer to conduct the steps of the transaction. The user interface 20 may incorporate a touch screen capability that allows user input during the transaction. The interface 20 also displays instructions regarding activities to be performed by the customer according to the pre-determined steps of the transaction.

For instance, in a typical self-checkout transaction, the SCO terminal will be activated by the customer touching the touch screen display of the user interface 20. The interface will display an instruction to the customer to scan an item to be purchased. Once a product scan has been detected by the processor, a new instruction is displayed directing the customer to place the newly scanned item into the bag well 25. Once the bagging step has been verified by the security scale 29, the processor asks the customer to scan the next item. This sequence of steps continues until the last product has been scanned, at which time the customer may touch a payment button on the display screen 20. The customer may be queried regarding the manner of payment, whether cash or debit/credit card, and whether the customer wishes to redeem coupons. Depending upon the response to these queries, the central processor activates the necessary component of the payment station 18—i.e., the coupon acceptor 32, the payment acceptor 34 and/or the card reader 38. If payment is by cash and change is owed, or if the terminal permits payment of additional cash to the customer, the central processor instructs the appropriate dispenser 42, 43 accordingly. Once the transaction is completed, a receipt is printed at the printer 45.

Although the information and instructions displayed on the user interface 20 are informative, it is not always sufficient to properly guide the customer through the various steps of the transaction. In order to provide as much guidance as possible, the terminal 10 of the present embodiment senses the customer's activities relative to each station of the terminal and provides an immediate visual feedback as to the appropriateness of that activity. Accordingly, a visual indicator 50a-h may be provided at each station or component of the terminal 10 at which a specific customer action is required. Thus, visual indicators 50a and 50b may be provided at the itemization station 14 and the bagging station 16, respectively. Likewise, visual indicators 50c, 50d, 50e and 50f may be provided adjacent the components of the payment station, namely the coupon acceptor 32, the cash acceptor 35, the coin acceptor 36 and the card reader 38, respectively. Visual indicators 50g and 50h may also at the cash and coin dispensers 42 and 43, respectively.

Associated with each visual indicator 50a-h is a proximity sensor 55a-h that generates a proximity signal usable by the processor of the terminal 10. The proximity sensors 55a-h are positioned close to the corresponding functional component of the terminal to detect the presence of the customer's hand at that component. The proximity sensors 55a-h have a short range of detection so that the customer's hand is only detected when it is very near the component, such as when the customer is intending to use that component. For instance, as shown in FIG. 1, a proximity sensor 50d is adjacent the cash acceptor 35 and is oriented so that when a customer attempts to deposit cash into the acceptor his/her hand or arm will necessarily come close enough to the sensor 50d to be detected. In a specific embodiment, the sensors 50a-h are calibrated to detect movement within only 1-2 inches of the sensor. Any movement outside the range of the sensor will not be detected, thereby avoiding any false or spurious detection signals. A greater proximity range may be preferable for the sensor 50a at the itemization station 14 and/or for the sensor 55b at the bagging station 16 since the area over which the customer may act at these stations is larger.

Each visual indicator 50a-h is activated or operable in response to a corresponding activation signal generated by a controller separate from or integrated into the central processor of the terminal 10. The controller is responsive to the proximity signal generated by the sensor 55a-h associated each particular visual indicator. The controller is also responsive to instructions generated by the processor to control the operability or activation of the components of the terminal, as explained in more detail herein.

With respect to the visual indicators, in one embodiment each indicator provides a visible signal to deter or encourage a customer action at a particular station. For example, if the processor is directing the customer to place a newly scanned item into the bag well 25, then the customer should be deterred from any activity other than placing the product in the bag well. Thus, the SCO terminal of the present invention provides a visible signal at the coin acceptor to deter the customer from attempting to deposit coins out of sequence for the transaction. On the other hand, a visible signal is provided to encourage the customer to complete the activity at the bag well that is necessary for the particular step of the transaction. Following common convention, the visual indicator to deter customer activity at a given location is a red light, while a green light is used to encourage the action. In one embodiment, a visual indicator 50, as shown in FIG. 2, may include a single translucent cover or lens 51 with separate red light 52 and a green light 53 behind the cover. The lights 52, 53 are preferably low power lights, such as color LEDs, with sufficient intensity to be clearly visible by the customer.

Rather than activate the visual indicators for all of the components (with all red lights except for a green light corresponding to the proper component), the present embodiment only activates the visual indicator corresponding to a component that the customer's hand/arm is near, or more pertinently a component that the customer appears to be intent on using. Thus, in the above example in which the customer has been instructed to place product in the bag well, if the customer attempts to place a coin in the coin acceptor 36, only the visual indicator 50e adjacent the coin acceptor will be activated. Once the customer moves his/her arm away from the coin acceptor, the visual indicator 50e is deactivated. When the customer finally moves toward the bag well 25 the visual indicator 50b will be activated. More specifically, in this example, the red light 52 is activated in the visual indicator 50e adjacent the coin acceptor since use of that component is to be deterred. The green light 53 is activated in the visual indicator 50b adjacent the bag well 25 to encourage activity at that location, as directed by the instructions displayed on the user interface screen 20.

The proximity sensors 55a-h provide the data necessary to discriminate as to which visual indicator is to be activated at any given time during the steps of the transaction. The central processor controlling the steps of the transaction, and more particularly issuing instructions to the components of the terminal, provides the data necessary to determine the nature of the visual indicator—a red light to deter or a green light to encourage. As indicated above, a particular visual indicator is not activated unless the customer is near the component associated with that particular visual indicator, as detected by the associated proximity sensor. Once customer proximity has been detected, the particular step in the transaction, as commanded by the processor, determines the nature of the visual indication, namely deter or encourage.

One manner of accomplishing this customer guidance capability can be explained with reference to the flow chart in FIG. 3. In the first step 100, the central processor displays an instruction on the user interface 20 according to the current step of the transaction. Thus, when the terminal 10 is initially accessed, the instruction to the customer would be to scan a product. Subsequent instructions may be to place the scanned item in bag well, place coupons in the coupon acceptor, place cash payment in the cash and coin acceptor, swipe a credit/debit card in the card reader or remove cash and change. The nature and sequence of these instructions is determined by the type of terminal and the software executed by the central processor.

In some embodiments, the user interface may include a button to cancel the transaction, hence the first conditional step 102 to determine whether the customer has cancelled, in which case the routine exits. In the next conditional step 103, a determination is made as to whether a predetermined period of time ΔT has expired, which would indicate that the customer has abandoned the transaction or is too confused to complete the transaction. Many customer service machines have a timeout condition that can be used to determine whether the routine is exited at step 103. If the transaction is to continue, the several proximity sensors are polled in step 105 and this loop continues at conditional step 106 until a sensor proximity signal is received. It is understood that the loops represented in the flowchart in FIG. 3 may be repeated many times a minute and preferably few times a second to accurately detect the activities of the customer at the terminal.

Alternatively, the entire sequence of steps in FIG. 3 starting at steps 105/106 may be initiated only when a sensor proximity signal is received by a controller or the central processor.

Once a signal has been acknowledged from any proximity sensor 50a-h a determination is made at step 110 whether the activated sensor is associated with a location, component or station of the terminal 10 at which a desired action is to be taken by the customer. For instance, if bagging a newly scanned item is the desired action, then the conditional step 110 will be answered "yes" if the sensor issuing a proximity signal is sensor 50b at the bag well 25. A proximity signal issued by any other sensor, such as sensor 50a or sensors 50c-g, will yield a "no" outcome. As seen in FIG. 3, the conditional step 110 receives date from the processor, which data is indicative of the desired location at the terminal. It should be understood that this comparison step 110 can be accomplished electronically or through software implemented by a separate controller or by the central processor.

If the activated sensor is at the desired location, as determined in conditional step 110, any other visual indicators that may have been previously activated are de-activated in step 115 and the visual indicator associated with the activated sensor is illuminated in step 117. In the illustrated embodiment, the green light 53 is activated to encourage the customer to use the component associated with the activated sensor and visual indicator. Since the customer has approached the component at which the desired action is to be taken (according to the current step dictated by the processor), there is no need for the visual indicators at the other locations to be illuminated. The display is thus focused on the location where the customer is to take action so there is no confusion on the part of the customer. Illuminating the green light provides an immediate signal to the customer that he/she has moved to the location/component where the commanded action is to be taken.

Once the green light has been illuminated at the desired location, the next step 120 is to determine whether the customer has actually commenced the desired action at that location. If this conditional is answered in the affirmative, meaning that the customer as commenced the desired action such as bagging a scanned item or making payment, then the visual indicator (green light 53) can be deactivated in step 122. Alternatively, the light can remain illuminated until the particular activity has been completed. Once the desired action has begun the loop in the flowchart of FIG. 3 can remain at idle unless and until a new instruction from the central processor has been acknowledged in the conditional step 125. A new instruction means a new activity by the customer so the loop returns to step 100.

If at the conditional step 120 it has been determined that the customer has not commenced the necessary action, then the process flow loops back to step 102 to assess whether the customer has cancelled the transaction (step 102), has exceeded a timeout condition (step 103) or is still engaged at the desired location/component of the terminal. Since the process flow in FIG. 3 is repeated many times a second it is likely that the many loops of the process will pass before the customer actually commences the desired action. However, it is possible that the customer has moved adjacent the desired location/component without any intention to perform the desired activity. Thus, repeating the loop from the conditional step 120 back to step 102 allows the terminal to determine whether the customer has moved away from the desired location and/or moved to another location/component of the terminal. In this case, the proximity sensor at the desired location will no longer detect the customer's presence so that either of the conditional steps 106 and 110 will then be answered in the negative. If the customer has moved away from all of the sensors, the conditional step 106 will be negative. If the customer has moved to another location and triggered another sensor, then conditional step 106 will be affirmative while conditional step 110 will be answered in the negative because the activated sensor is not at the desired location.

When the customer has moved to a location/component at which no activity is to be currently taken, the terminal of the present embodiment provides a visual indication to deter any activity at that location—i.e., the red light 52 is illuminated. Thus, when the process flow is diverted at step 110, any previously activated lights at another location/component of the terminal is deactivated in step 112 and in step 113 the red light is activated at the location that the customer is currently near. The illumination of the red light will immediately signal to the customer that he/she is not at the correct location for the action commanded on the user interface 20. The process flow continues through the loops in the flowchart of FIG. 3 until customer has moved to the correct location/component, or until the transaction has timed out or been cancelled.

It can be appreciated that the system of proximity sensors 50a-h and visual indicators 55a-h will provide immediate feedback to the customer to guide him/her through the transaction. The visual indicators are only illuminated when and for as long as the customer is proximate the particular location or component on the terminal 10. For example, if the desired action is for the customer to make payment by swiping her/his debit/credit card in the card reader 38, it is possible that the customer's hand will pass near the coupon acceptor 32, the cash acceptor 35 and the coin acceptor 36 before settling at the card reader 38. As the customer's hand moves proximate the coupon acceptor, the sensor 50c will be activated and the red light in the visual indicator 55c will be illuminated. As the customer's hand continues on its path, the indicator 55c will be deactivated, and the red light in the indicators 55d and 55e will be similarly activated and deactivated. Once the customer's hand reaches the card acceptor, the sensor 50f will be activated and the green light of the visual indicator 55f will be illuminated signifying that the customer should undertake the desired activity at this location. The present system further accounts for the customer's uncertainty regarding the action to be taken, and more specifically accounts for circumstances in which the customer moves away from a desired location.

The proximity sensors 50a-h and the associated visual indicators 55a-h may be provided as discrete modules that can be added to or integrated into a customer service machine, such as the SCO terminal 10 of the illustrated embodiment. Similarly, a controller may be software-based, digital or electronic, and may be provided separate from or integrated with the central processor of the machine. The process steps in the flowchart of FIG. 3 may be implemented in software based on outputs from the proximity sensors (converted to digital signals if necessary), or may be incorporated into electronic circuitry that receives the outputs from the proximity sensors as well as data from the central processor.

In the illustrated embodiment, the indicators 55a-h provide a visually sensible signal to the customer. Alternatively, an audible signal may be combined with certain of the indicators. In this instance, it may be preferable to limit the audible signal to a pleasant confirmatory sound in conjunction with illumination of a green light when the customer is at the proper location of the machine. For enhanced accessibility, every indicator would have an associated sound for the visually impaired customer. In this instance, the confirmatory sound associated with a green light indicator could be a pleasant "beep" or "ding", while the sound associated with the red light could be a buzzer or similar unpleasant sound to act as a deterrent. The audible signal could be a spoken word, such as "correct" or "wrong".

With respect to the visual indicators, the lights 52, 53 may be continuously illuminated when activated. Alternatively, the lights could be strobed, particularly if the customer is detected at the particular location or station for an unexpected length of time. For instance, a green light 53 may be initially continuously illuminated once the customer reaches the proper location or station on the machine. If the associated sensor detects the customer's continued presence at that location without taking the necessary action associated with that location, the green light may begin to blink to attract the customer's attention. This modified signal may be accompanied by an audible signal, such as a spoken word signal like "Do you need help?".

In some customer service machine configurations, a cashier or clerk is available to monitor and assist a customer during at transaction. The sequence of steps in the flowchart of FIG. 3 may be modified to account for intervention by a store clerk. For instance, when a customer is being helped by a store clerk, the conditional step 103 regarding expiration of a pre-determined time period may be temporarily bypassed.

The central processor of the machine 10 may collect data concerning the activation of the various sensors and indicators during customer transactions. This data may provide an indication of a typical pattern in customers' use of the machine. This data may be used to adjust usability factors for the particular machine or transaction. In addition, this data may be evaluated for a particular customer to determine whether this guidance feature is necessary for that customer. The user interface 20 and central processor may be configured to allow the customer to deactivate this guidance feature at the beginning of a transaction or at any time during the transaction once the customer feels comfortable with the use of the machine 10.

What is claimed is:

1. A method for guiding a customer in the use of a customer service machine having a plurality of stations at which a customer performs an activity in accordance with a sequence of pre-determined steps in furtherance of a transaction to be completed at the machine, comprising the steps of:

detecting the presence of the customer by a proximity sensor immediately adjacent one of the plurality of stations, wherein each of the plurality of stations has a corresponding proximity sensor;

determining by a processor whether an activity is to be performed in accordance with the sequence at the one station where the customer presence is detected in accordance with a current one of the pre-determined steps;

providing a first visual indication by an indicator adjacent the one station encouraging the activity when the activity is to be performed in accordance with the sequence and the one station is a next station in the sequence, wherein each of the plurality of stations has a corresponding indicator; and providing a second visual indication by the indicator deterring the activity when the activity is not to be performed in accordance with the sequence and the one station is not the next station in the sequence.

2. The method for guiding a customer in the use of a customer service machine of claim 1, further comprising the step of deactivating the visual indicator when the presence of the customer at the one station is no longer detected.

3. The method for guiding a customer in the use of a customer service machine of claim 1, wherein the second visual indication includes a red light and the first visual indication includes a green light.

4. The method for guiding a customer in the use of a customer service machine of claim 1, further comprising the steps of:
   determining that the activity has commenced at the one station; and at that time, deactivating the first visual indication.

5. A method for guiding a customer through a pre-determined sequence of steps in a check-out transaction at a self check-out (SCO) terminal having an itemization station including a scanner for scanning a coded product, a bagging station including a scale for registering the weight of a product placed at the bagging station, and a payment station including a payment acceptor with a cash acceptor, a coin acceptor and a card reader, the method comprising the steps of:
   polling a proximity sensor immediately adjacent one of the plurality of stations by a processor, wherein each of the plurality of stations has a corresponding proximity sensor;
   detecting by the processor the presence of the customer immediately adjacent the one station;
   determining by the processor whether an activity is to be performed by the customer at the one station in furtherance of the check-out transaction;
   activating a first indicator light adjacent the one station by the processor to encourage the activity when the activity is to be performed in accordance with the sequence and the one station is a next station in the sequence, wherein each of the plurality of stations has a corresponding first indicator light; and
   activating a second indicator light adjacent the one station by the processor to discourage the activity when the activity is not to be performed in accordance with the sequence and the one station is not the next station in the sequence, wherein each of the plurality of stations has a corresponding second indicator light.

6. The method for guiding a customer through a check-out transaction of claim 5, further comprising the step of deactivating the first and second indicator lights when the presence of the customer at the one station is no longer detected.

7. The method for guiding a customer through a check-out transaction of claim 5, wherein the second indicator light includes a red light and the first indicator light includes a green light.

8. The method for guiding a customer through a check-out transaction of claim 5, further comprising the steps of:
   determining whether the activity has commenced at the one station; and if so, deactivating the first indicator light.

9. The method for guiding a customer through a check-out transaction of claim 5, wherein the first and second indicator lights are activated only as long as the presence of the customer is detected at the station.

10. The method for guiding a customer through a check-out transaction of claim 5, wherein the step of detecting the presence of the customer includes polling proximity sensors disposed adjacent at least the bagging station and the payment station.

11. The method for guiding a customer through a check-out transaction of claim 5, wherein the step of detecting the presence of the customer includes polling proximity sensors disposed adjacent at least the bagging station, the cash acceptor, the coin acceptor and the card reader.

12. A self-service checkout (SCO) terminal at which a customer conducts a transaction, the SCO terminal comprising:
   an itemization station including a scanner to scan a coded product, an itemization station proximity sensor, a first itemization station indicator light, and a second itemization station indicator light;
   a bagging station including a scale to register the weight of product placed at the bagging station, a bagging station proximity sensor, a first bagging station indicator light, and a second bagging station indicator light;
   a payment station including a payment acceptor with a cash acceptor and a coin acceptor, a card reader, a payment station proximity sensor, a first payment station indicator light, and a second bagging station indicator light;
   a central processor to process a transaction conducted at the terminal and to issue control instructions to activate each of the stations according to a pre-determined sequence of steps in the transaction;
   a display coupled to the central processor and operable to direct the customer to perform an activity at each of the stations according to the pre-determined steps in the transaction;
   wherein the itemization station proximity sensor, the bagging station proximity sensor, and the payment station proximity sensor are operable to detect the presence of the customer when the customer is immediately adjacent the itemization station, the bagging station, and the payment station and to generate an itemization station proximity signal, a bagging station proximity signal, and a payment station proximity signal in response thereto; and
   wherein the central processor receives one of the itemization station proximity signal, the bagging station proximity signal, and the payment station proximity signal, determines whether a corresponding activity at one of the itemization station, the payment station, and the bagging station is to be performed by the customer in furtherance of the check-out transaction, activates a corresponding first indicator light of the first itemization station indicator light, the first bagging station indicator light, and the first payment station indicator light to encourage the activity when the activity is to be performed in accordance with the sequence and the one station is the next station in the sequence, and activates a corresponding second indicator light of the second itemization station indicator light, the second bagging station indicator light, and the second payment station indicator light to discourage the activity when the activity is not to be performed in accordance with the sequence and the one station is not the next station in the sequence.

13. The self-service checkout (SCO) terminal of claim 12, wherein the second itemization station indicator light, the second bagging station indicator light, and the second payment station indicator light are red lights and the first itemization station indicator light, the first bagging station indicator light, and the first payment station indicator light are green lights.

* * * * *